US009804964B2

(12) United States Patent
Shribman et al.

(10) Patent No.: US 9,804,964 B2
(45) Date of Patent: Oct. 31, 2017

(54) METHOD FOR INCREASING CACHE SIZE

(71) Applicant: HOLA NETWORKS LTD., Netanya (IL)

(72) Inventors: Derry Shribman, Tel Aviv (IL); Ofer Vilenski, Moshav Hadar Am (IL)

(73) Assignee: Hola Networks Ltd., Netanya (IL)

( * ) Notice: Subject to any disclaimer, the term of this patent is extended or adjusted under 35 U.S.C. 154(b) by 0 days.

(21) Appl. No.: 15/350,056

(22) Filed: Nov. 13, 2016

(65) Prior Publication Data

US 2017/0060747 A1 Mar. 2, 2017

Related U.S. Application Data

(63) Continuation of application No. 14/925,437, filed on Oct. 28, 2015, now Pat. No. 9,519,593, which is a
(Continued)

(51) Int. Cl.
*G06F 12/12* (2016.01)
*G06F 12/0846* (2016.01)
(Continued)

(52) U.S. Cl.
CPC ........ *G06F 12/0846* (2013.01); *G06F 12/023* (2013.01); *G06F 12/0851* (2013.01); *G06F 12/0871* (2013.01); *G06F 12/0875* (2013.01); *G06F 12/12* (2013.01); *G06F 12/128* (2013.01); *G06F 17/30132* (2013.01); *G06F 12/0842* (2013.01); *G06F 2212/1044* (2013.01); *G06F 2212/403* (2013.01); *G06F 2212/452* (2013.01); *G06F 2212/604* (2013.01); *G06F 2212/6042* (2013.01); *G06F 2212/621* (2013.01); *G06F 2212/69* (2013.01)

(58) Field of Classification Search
CPC ............. G06F 12/0804; G06F 12/0875; G06F 12/128; G06F 12/12; G06F 2212/1044; G06F 12/023; G06F 12/0897; G06F 12/0846; G06F 12/0851; G06F 2212/452; G06F 12/0842; G06F 12/0866; G06F 12/0871; G06F 17/30132; G06F 2212/403
See application file for complete search history.

(56) References Cited

U.S. PATENT DOCUMENTS 5,577,243 A 11/1996 Sherwood et al.
8,135,912 B2 3/2012 Shribman et al.
(Continued)

OTHER PUBLICATIONS

International Search Report of PCT/US2010/034072 dated Jul. 1, 2010.

*Primary Examiner* — Thong Q Le
(74) *Attorney, Agent, or Firm* — May Patents Ltd.

(57) ABSTRACT

A method for increasing storage space in a system containing a block data storage device, a memory, and a processor is provided. Generally, the processor is configured by the memory to tag metadata of a data block of the block storage device indicating the block as free, used, or semifree. The free tag indicates the data block is available to the system for storing data when needed, the used tag indicates the data block contains application data, and the semifree tag indicates the data block contains cache data and is available to the system for storing application data type if no blocks marked with the free tag are available to the system.

22 Claims, 17 Drawing Sheets

Related U.S. Application Data continuation of application No. 14/210,995, filed on Mar. 14, 2014, now Pat. No. 9,201,808, which is a continuation of application No. 14/024,977, filed on Sep. 12, 2013, now Pat. No. 8,719,505, which is a continuation of application No. 13/363,784, filed on Feb. 1, 2012, now Pat. No. 8,578,098, which is a continuation of application No. 12/467,814, filed on May 18, 2009, now Pat. No. 8,135,912.

(51) Int. Cl.
  *G06F 17/30* (2006.01)
  *G06F 12/128* (2016.01)
  *G06F 12/02* (2006.01)
  *G06F 12/0871* (2016.01)
  *G06F 12/0875* (2016.01)
  G06F 12/0842 (2016.01)

(56) References Cited

U.S. PATENT DOCUMENTS

| | | |
|---|---|---|
| 8,719,505 B2 | 5/2014 | Shribman et al. |
| 9,201,808 B2 * | 12/2015 | Shribman ............. G06F 12/128 |
| 2004/0254907 A1 | 12/2004 | Crow et al. |
| 2005/0015552 A1 | 1/2005 | So et al. |
| 2005/0228964 A1 | 10/2005 | Sechrest et al. |
| 2006/0259728 A1 | 11/2006 | Chandrasekaran et al. |
| 2008/0086730 A1 | 4/2008 | Vertes |
| 2012/0191911 A1 | 7/2012 | Shribman et al. |

\* cited by examiner

STORAGE SPACE
NON DETERMINISTIC STORAGE

| ND_FILE_SYSTEM_DB | | |
|---|---|---|
| FILE_NAME | BLOCK_NUMBER | BLOCK_CHECKSUM |
| PAGE1_CACHE | 122 | A1092E392FF2332FA |
| | 123 | EFA392767BC3928DE |
| | 124 | 89A392767BC3928DE |
| | 926 | 89BC3928DEBC3928D |
| | 927 | BC3928DEBC3928DE1 |
| PAGE2_CACHE | 392 | A109BC3928DEFF233 |
| | 393 | BC3928DEFEAA39271 |
| PAGE3_CACHE | 12 | BC3928DEBC3928DEE |
| | | |
| | | |

| ND_BLOCK_STORAGE_DB | | |
|---|---|---|
| BLOCK_NUMBER | BLOCK_CHECKSUM | VERIFIED? |
| 122 | A1092E392FF2332FA | YES |
| 123 | EFA392767BC3928DE | YES |
| 124 | 89A392767BC3928DE | NO |
| 125 | 991FEAA392767BC39 | YES |
| 126 | A1092E392FF2332AA | NO |
| 127 | EFA392767BC3928DE | NO |
| 128 | A1092E392FF2332FF | NO |
| 129 | EFA392767BC3928DE | YES |
| 130 | 89A392767BC3928DE | NO |
| 131 | 991FEAA392767BC39 | NO |

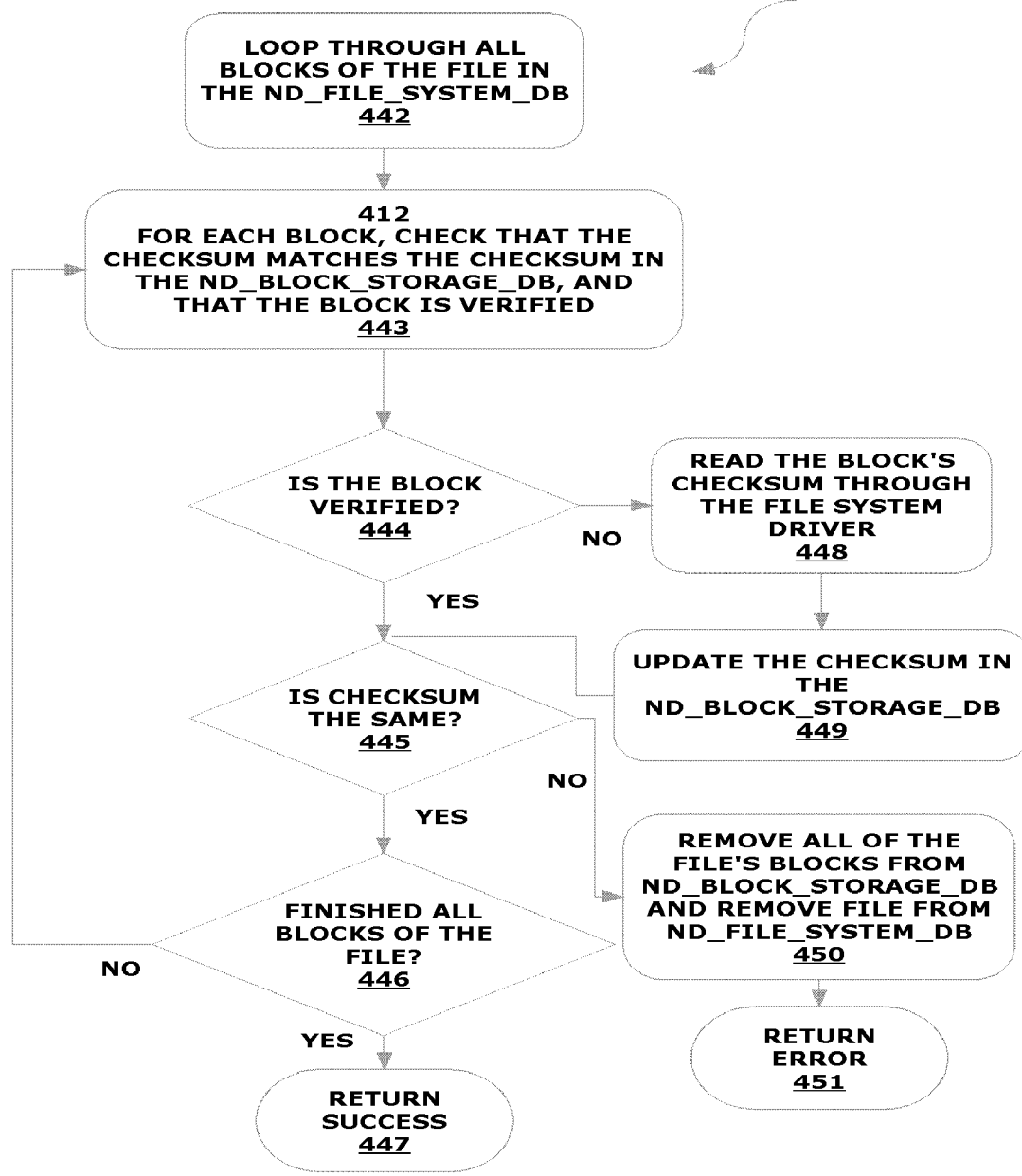

METHOD FOR INCREASING CACHE SIZE

CROSS-REFERENCE TO RELATED APPLICATIONS

The present application is a continuation application, and claims priority to, co-pending U.S. patent application Ser. No. 14/925,437 filed on Oct. 28, 2015, and having the title "METHOD FOR INCREASING CACHE SIZE", which is a continuation of, and claims priority to, U.S. patent application Ser. No. 14/210,995, filed on Mar. 14, 2014, and having the title "METHOD FOR INCREASING CACHE SIZE", now patented as U.S. Pat. No. 9,201,802, issued on Dec. 1, 2015, which is a continuation of, and claims priority to, U.S. patent application Ser. No. 14/024,977, filed on Sep. 12, 2013, and having the title "METHOD FOR INCREASING CACHE SIZE", now patented as U.S. Pat. No. 8,719,505, issued on May 6, 2014, which is a continuation of, and claims priority to, U.S. patent application Ser. No. 13/363,784, filed on Feb. 1, 2012, and having the title "SYSTEM AND METHOD FOR INCREASING CACHE SIZE," now patented as U.S. Pat. No. 8,578,098, issued on Nov. 5, 2013, which is a continuation of, and claims priority to U.S. patent application Ser. No. 12/467,814, filed on May 18, 2009, and having the title "SYSTEM AND METHOD FOR INCREASING CACHE SIZE," now patented as U.S. Pat. No. 8,135,912, issued on Mar. 13, 2012, all of which are incorporated herein by reference in their entirety.

FIELD OF THE INVENTION

The present invention is generally related to electronic storage, and more particularly is related to maximizing cache size.

BACKGROUND OF THE INVENTION

Information stored by applications may be viewed as two types, namely, application data and cached data. Application data is data that an application, or its users, depends on for normal operation. Examples of application data may include bank account information stored by a bank application, or a document saved by a word processing application. Application data may be regarded as requiring "100% storage reliability", because application data that is written to a storage device must always be retrievable.

Unlike application data, cached data is data that the application does not depend on for normal operation, but that is stored in order to possibly benefit from for purposes of accelerating application operation. Specifically, a cache is a temporary storage area where frequently used data can be stored for rapid access. This data is referred to as cached data. Once the data is stored in the cache, future use by an application can be made by accessing the cached copy rather than re-fetching or re-computing the original data, so that the average access time is shorter. An example of cached data may be pages stored by a Web browser after the pages were viewed, just in case the user wants to view the pages again. In this example, if the user wants to view the pages again, but the cached copies of the pages which were written to the cache are no longer found, the browser will maintain its normal mode of operation, by bringing that information from the web site itself FIG. 1 is a block diagram illustrating a basic prior art file system. For exemplary purposes, FIG. 1 shows that there are multiple applications, illustrated as application blocks 101, 102, and 103, that wish to manipulate files (store, write, read, delete, or other function calls). The applications 101, 102, 103, call on a common, operating system level file system application programming interface (API) 104 that is capable of implementing the manipulation commands. The file system API 104 is implemented by a file system driver 105, which uses smaller blocks of data as the basic building blocks of the files. These blocks of data, are manipulated by a block storage handler and device driver 106. It is noted that the file system API 104, file system driver 105, and the block storage handler and device driver 106 are each provided by an operating system. The actual data is stored on a physical block storage device 107, which may be a hard disk, flash memory, solid state disk, or a different storage device.

As is known by those having ordinary skill in the art, for each memory block, the block storage handler and device driver maintain data that describes the memory block. This information about the block may contain the address of the memory block, size, or other characteristics of the memory block. As is also known, a file system typically has two types of blocks, namely, "used," which are blocks that currently contain data which is to be kept, and "free," which are blocks that may be used by the file system to store data in the future. A memory block typically has metadata associated with it, where the metadata that may include any type of information related to the block that is useful for the operating system.

FIG. 2 is a schematic diagram illustrating a prior art block storage device 110. As shown by FIG. 2, the block storage device 110 has blocks that are classified as either "free" or "used."

Unfortunately, file systems today treat "reliable data" (application data) in the same way that the "non-reliable data" (cached data) is treated. Specifically, both application data and cached data are stored into "free" memory blocks, after which the block is categorized as "used." This brings about a reality where applications are careful about how much cached data is saved, so that enough room is left on a storage device for the application data. The result is lower performance for the overall system than may theoretically be achieved.

Thus, a heretofore unaddressed need exists in the industry to address the aforementioned deficiencies and inadequacies.

SUMMARY OF THE INVENTION

Embodiments of the present invention provide a system and method for increasing cache size. Briefly described, in architecture, one embodiment of the system, among others, can be implemented as follows. The system contains a memory and a processor, wherein the processor is configured by the memory to perform the steps of: categorizing storage blocks within the storage device within a first category of storage blocks if the storage blocks are available to the system for storing data when needed; categorizing storage blocks within the storage device within a second category of storage blocks if the storage blocks contain application data therein; and categorizing storage blocks within the storage device within a third category of storage blocks if the storage blocks are storing cached data and are available for storing application data if no first category of storage blocks are available to the system.

Other systems, methods, and features of the present invention will be or become apparent to one with skill in the art upon examination of the following drawings and detailed description. It is intended that all such additional systems, methods, and features be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 16B is a flowchart further illustrating the step of determining whether the file being written to is still valid.

DETAILED DESCRIPTION

Figure 1:
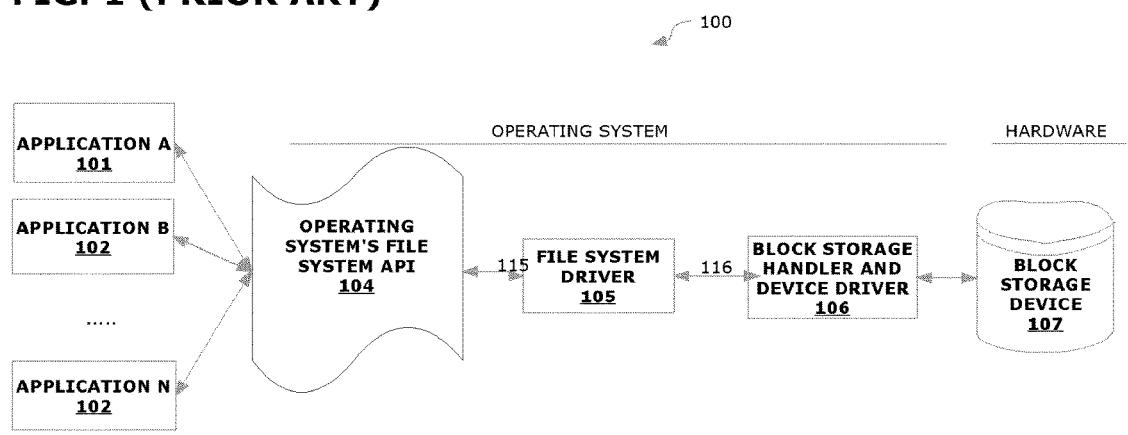
FIG. 1 is a block diagram illustrating a basic prior art file system.
Figure 2:
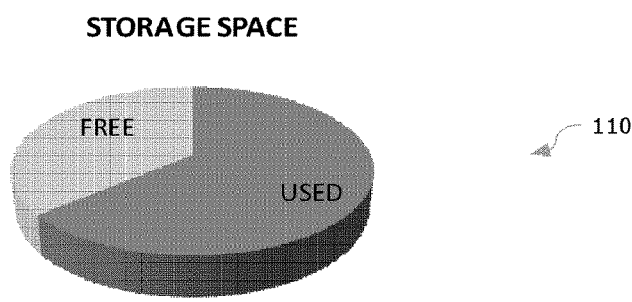
FIG. 2 is a schematic diagram illustrating a prior art block storage device.

The present system and method provides for increasing the total amount of cached data that may be stored on a storage device, without diminishing from the storage space available for normal application data, by allowing for non-deterministic file handling. Specifically, cached data is stored on the free space of a storage device, however, the space on which cached data is stored is still regarded as free space for application data. By providing for non-deterministic file handling, much more cache data can be stored than in regular file systems, since there is no concern about 'conserving' space for future application data. It should be noted that a non-deterministic file or block is the same as a non-reliable file or block, and a deterministic file or block is the same as a reliable file or block.

While the following describes the present system and method in detail it is beneficial to provide certain definitions that are known to those having ordinary skill in the art.

Cache: Cache is a collection of data duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, future use can be made by accessing the cached copy rather than re-fetching or re-computing the original data, so that the average access time is shorter. Cache has proven to be extremely effective in many areas of computing because access patterns in typical computer applications have locality of reference.

Data Storage Device: A data storage device is a device for recording (storing) information (data). Recording can be done using virtually any form of energy, spanning from manual muscle power in handwriting, to acoustic vibrations in phonographic recording, to electromagnetic energy modulating magnetic tape and optical discs. A storage device may hold information, process information, or both. A device that only holds information is a recording medium. Devices that process information (data storage equipment) may either access a separate portable (removable) recording medium or a permanent component to store and retrieve information.

Block: In computing, specifically data transmission and data storage, a block is a sequence of bytes or bits, having a nominal length (a block size). Data thus structured is said to be blocked. The process of putting data into blocks is referred to as blocking. Blocking is used to facilitate the handling of the data-stream by a computer program receiving the data. Blocked data is normally read a whole block at a time. Blocking is almost universally employed when storing data to 9-track magnetic tape, to rotating media such as floppy disks, hard disks, optical discs, and to NAND flash memory. Most file systems are based on a block device, which is a level of abstraction for the hardware responsible for storing and retrieving specified blocks of data, though the block size in file systems may be a multiple of the physical block size. It should be noted that in classical file systems, a single block may only contain a part of a single file.

File System: Most file systems make use of an underlying data storage device that offers access to an array of fixed-size blocks, sometimes referred to as sectors, generally a power of 2 in size (512 bytes or 1, 2, or 4 Kb are most common). File system software is responsible for organizing these sectors into files and directories, and keeping track of which sectors belong to which file and which sectors are not being used. Most file systems address data in fixed-sized units called "clusters" or "blocks" which contain a certain number of disk sectors (usually 1-64). This is the smallest logical amount of disk space that can be allocated to hold a file.

However, it is noted that file systems need not make use of a storage device at all. A file system can be used to organize and represent access to any data, whether it be stored or dynamically generated.

Metadata: Metadata is bookkeeping information typically associated with each file within a file system. The length of the data contained in a file may be stored as the number of blocks allocated for the file or as an exact byte count. The time that the file was last modified may be stored as the timestamp of the file. Some file systems also store the file creation time, the time it was last accessed, and the time that the metadata of the file was changed. Other information can include the device type (e.g., block, character, socket, sub-directory, or other device types), owner user-ID and group-ID, and access permission settings of the file (e.g., whether the file is read-only, executable, or other properties).

The present system and method, also referred to herein as a caching system and method, can be implemented in software, firmware, hardware, or a combination thereof. In a first exemplary embodiment, the caching system 10 is provided by a special or general-purpose digital computer, such as a personal computer, workstation, minicomputer, PDA, mobile computing platform, or mainframe computer. The first exemplary embodiment of a general-purpose computer architecture that can implement the caching system 10 is shown in FIG. 3.

Figure 3:
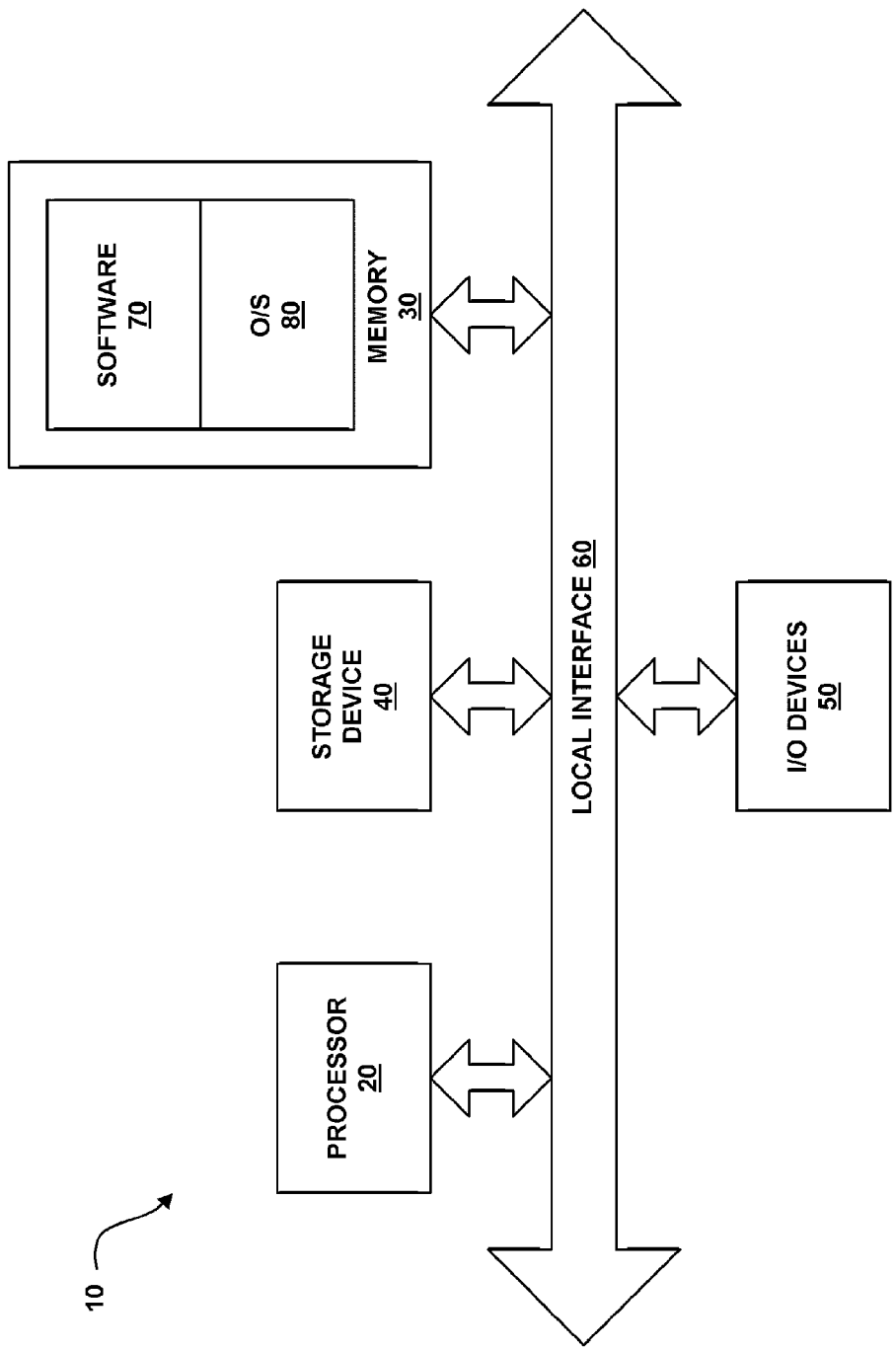
FIG. 3 is a block diagram illustrating a general-purpose computer architecture that can implement the caching system of the present invention.

Generally, in terms of hardware architecture, as shown in FIG. 3, the computer 10 includes a processor 20, memory 30, storage device 40, and one or more input and/or output (I/O) devices 50 (or peripherals) that are communicatively coupled via a local interface 60. The local interface 60 can be, for example but not limited to, one or more buses or other wired or wireless connections, as is known in the art. The local interface 60 may have additional elements, which are omitted for simplicity, such as controllers, buffers (caches), drivers, repeaters, and receivers, to enable communications. Further, the local interface 60 may include address, control, and/or data connections to enable appropriate communications among the aforementioned components.

The processor 20 is a hardware device for executing software, particularly that stored in the memory 30. The processor 20 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 30 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 30 may incorporate electronic, magnetic, optical, and/or other types of storage media. Note that the memory 30 can have a distributed architecture, where various components are situated remote from one another, but can be accessed by the processor 20.

Software 70 in the memory 30 may include one or more separate programs, each of which comprises an ordered listing of executable instructions for implementing logical functions of the caching system 10, as described below. In the example of FIG. 3, the software 70 in the memory 30 defines certain functionality of the caching system 10 in accordance with the present invention, as is described in detail herein. In addition, the memory 30 contains an operating system (O/S) 80. The operating system 80 essentially controls the execution of computer programs and provides scheduling, input-output control, file and data management, memory management, and communication control and related services. FIG. 3 further illustrates certain elements of the O/S 80, as is described below.

Returning to FIG. 3, the caching system 10 may be provided by a source program, executable program (object code), script, or any other entity containing a set of instructions to be performed. When a source program, then the program needs to be translated via a compiler, assembler, interpreter, or the like, which may or may not be included within the memory 30, so as to operate properly in connection with the O/S 80. Furthermore, the caching system 10 can be written as (a) an object oriented programming language, which has classes of data and methods, or (b) a procedure programming language, which has routines, subroutines, and/or functions.

The I/O devices 50 may include input devices, for example but not limited to, a keyboard, mouse, scanner, microphone, or other input device. Furthermore, the L/O devices 50 may also include output devices, for example but not limited to, a printer, display, or other output device. Finally, the I/O devices 50 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

The storage device 40 may be any block data storage device, such as, but not limited to, floppy disks, hard disks or hard drives, optical discs, NAND flash memories, or any storage device capable of maintaining a sequence of bytes or bits having a nominal length (block size).

When the caching system 10 is in operation, the processor 20 is configured to execute the software 70 stored within the memory 30, to communicate data to and from the memory 30, and to generally control operations of the computer 10 pursuant to the software 70. The software 70 and the O/S 80, in whole or in part, but typically the latter, are read by the processor 20, perhaps buffered within the processor 20, and then executed.

When the caching system 10 is implemented in software, it should be noted that the caching system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The caching system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the caching system 10 is implemented in hardware, the caching system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), or other technologies.

Figure 4:
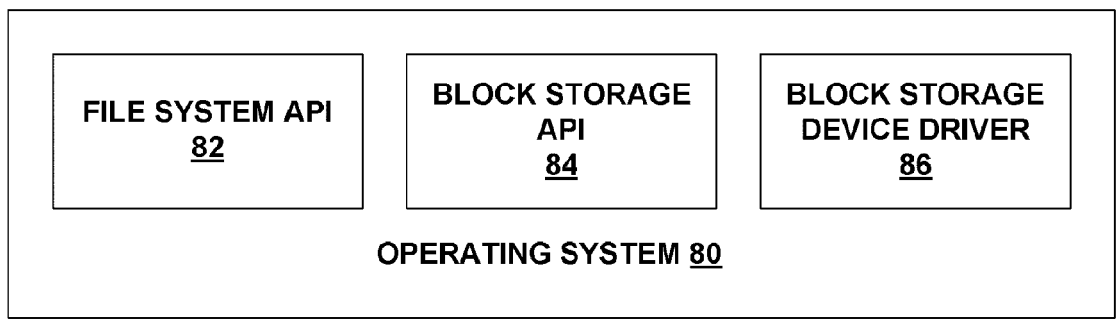
FIG. 4 is a block diagram illustrating certain elements of the operating system of FIG. 3.

As previously mentioned, FIG. 4 further illustrates certain elements of the O/S 80. As shown by the block diagram of FIG. 4 the O/S 80 contains a file system application programming interface (API) 82, a block storage API 84, and a block storage device driver 86. The file system API 82 provides a programming interface for data storage manipulation and the block storage API 84 provides a programming interface to the file system, for storing discrete elements on the storage device 40. In addition, the block storage device driver 86 is a piece of software stored within the O/S 80 that manipulates the block storage device 40 of the computer 10 to provide the functionality of the O/S 80.

Contrary to the prior art, which only provides a "free" and "used" category for storage blocks, the present caching system and method adds a third category for storage blocks, namely, "semifree." A "semifree" block is one that is storing cached data, and which may be consumed by application data if no "free" blocks are available for the application data. To provide this new category type, the file system is modified to add this type of data tag to the metadata of each block of data. This tag marks each data block of the storage device 40 as either "free," "semifree," or "used," and is continuously updated by the file system of the computer 10 as required. It should be noted that the modification to the file system is not only in tagging the blocks, but also manipulating them differently the blocks differently, as is described herein in detail.

In accordance with the present caching system and method, as is explained in more detail below, when an application stores data, the application requests from the operating system 80 that this data be stored in a deterministic fashion, or in a non-deterministic fashion. Storing in a deterministic fashion means that the data must be stored in a manner so that the application must be able to retrieve the data in the future. Alternatively, storing in a non-deterministic fashion means that it is not mandatory that the data be stored in a manner so that the application is able to retrieve the data in the future.

The present system and method uses deterministic storage for storing application data, and non-deterministic storage for storing cached data. The method of storage is selected by the application when calling the file system API 82 of the operating system 80. When deterministic storage is called for, meaning that a call is made by an application to save application data, the O/S 82 looks for storage blocks that are free, meaning that the storage blocks are not being used for application data, or cached data, and allocates those blocks for the new data stored. If no such blocks are found, then the O/S 80 will use blocks identified as "semifree," meaning that the blocks are storing cached data, and thus will decrease the total size of the cached data to provide the required space for the application data.

Alternatively, when non-deterministic storage is called for, meaning that a call is made by an application to save cache data, the file system looks for "free" storage blocks to use for this purpose. If no such "free" blocks are found, the file system returns an error code, to which an application may respond by asking to free other cached data ("semifree" blocks) that are less important to the application.

Fortunately, the abovementioned process, which is described in detail below, provides applications with the ability to use all of the available space on a storage device for cached data, without compromising application data. This increases the size available to caching systems, thereby potentially increasing performance of applications.

Figure 5:
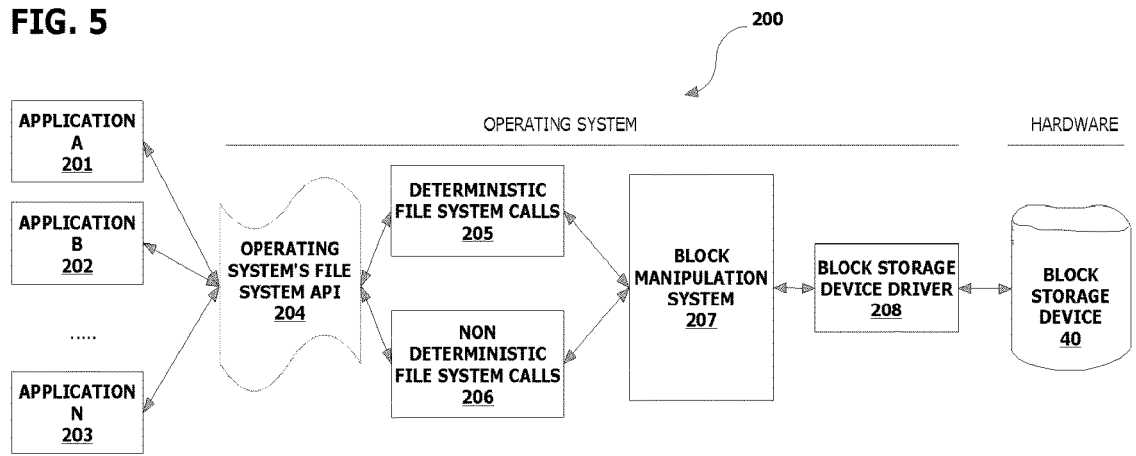
FIG. 5 is a block diagram illustrating a non-deterministic file system in accordance with the present caching system.

FIG. 5 is a block diagram illustrating a non-deterministic file system in accordance with the present caching system 10. For exemplary purposes, FIG. 5 shows that there are multiple applications, illustrated as application blocks 201, 202, and 203, that wish to manipulate files (store, write, read, delete, or other function calls). The applications 201, 202, 203, call on a common, operating system level file system application programming interface (API) 204 that is capable of implementing the manipulation commands. In addition to this API 204, for every such function call exists a non-deterministic function call. The applications 201, 202, 203 call non-deterministic function calls for storing data that may be overwritten by other data stored on the storage device 40, for example, cache data.

Non-deterministic file system calls 206 allocate "free" blocks and mark them as "semifree" for the duration of their use as cache data storage blocks on the storage device 40, while these blocks may be overwritten by deterministic file system calls 205. Both types of files use a block manipulation system 207 for handling both deterministic and non-deterministic files. A block storage handler and device driver 208, which manipulates blocks of data, is the same as in the prior art and is in communication with the storage device 40.

For each block of data on the storage device 40, there exists metadata that is used by the O/S 80. For each block within the storage device 40 metadata is stored. In addition to the metadata stored, a block status marker is added to each block of the storage device 40. The block status marker may be one of "free," "semifree," or "used."

Figure 6:
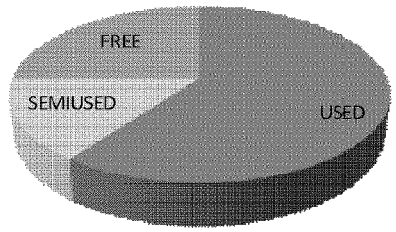
FIG. 6 is a schematic diagram illustrating the block storage device of the computer.

In comparison to the prior art, FIG. 6 is a schematic diagram illustrating the block storage device 40 of the computer 10. As shown by FIG. 6, the free space on the storage device 40 is partitioned as either totally free space, which is marked as "free," space that is used for caching, but is free to the user to use, which is marked as "semifree," or space used by applications for deterministic storage, which is marked as "used."

Figure 7:
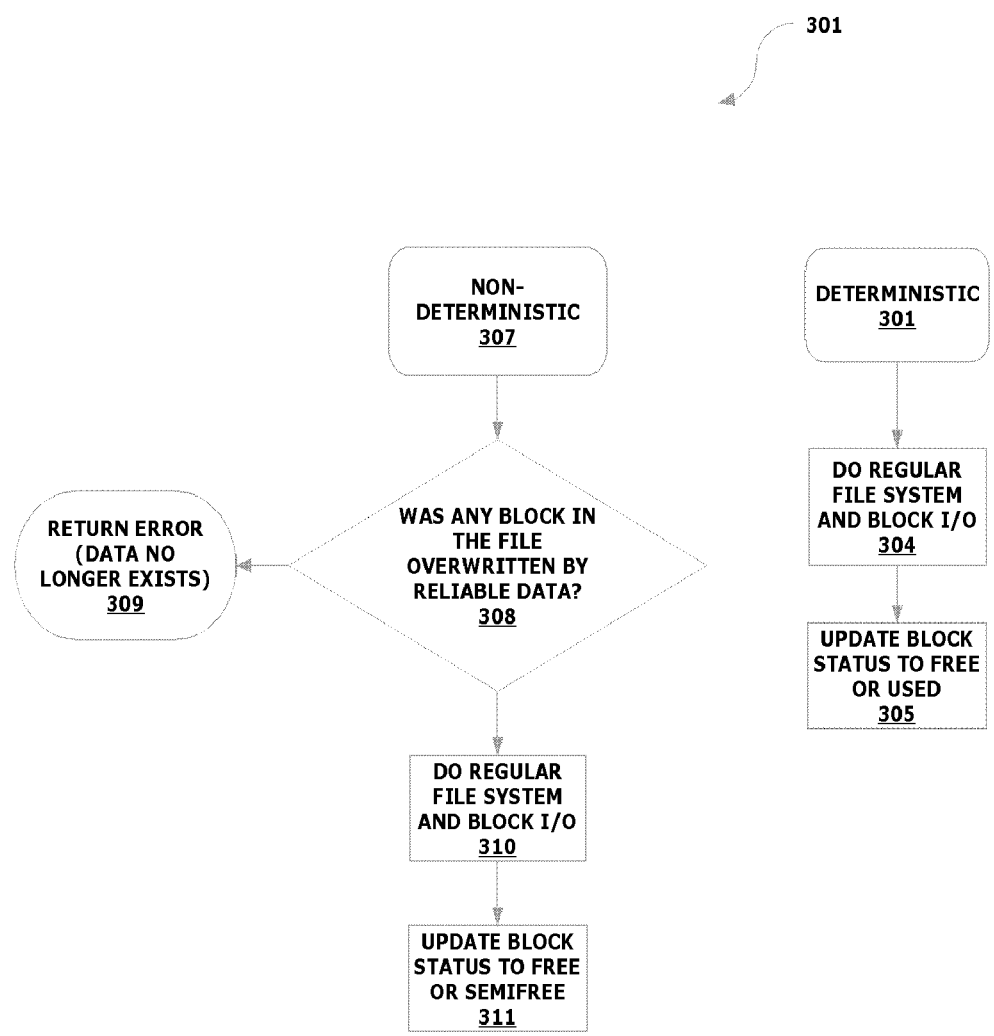
FIG. 7 is a flowchart illustrating high level functions performed by the caching system in receiving and handling deterministic and non-deterministic commands, in accordance with the first exemplary embodiment of the invention.

Having described the structure of the present caching system 10, the following further describes functionality performed by the caching system 10. FIG. 7 is a flowchart 301 illustrating high level functions performed by the caching system 10 in receiving and handling deterministic and non-deterministic commands, in accordance with a first exemplary embodiment of the invention. Specifically, the file system of the present invention determines whether a command received from an application is deterministic (reliable file manipulation) or not, and calls on the block manipulation system 207, the functions of which are outlined in FIG. 7.

It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Deterministic file system calls are called directly to the deterministic file system driver 205 (FIG. 5), while non-deterministic calls are made directly to the non-deterministic file system call driver 206 (FIG. 5). If a received command is deterministic, then regular block I/O and file system manipulation is performed (block 304), and the relevant block within the storage device 40 used for storing of the data is updated to be marked as "used" as long as the data is stored within the block, or "free" if the block was released by the file system (block 305) It should be noted that if release is called through a deterministic file system call, such as for deterministic data, then the regular release process is done. If release is called through the non-deterministic system call, then all the blocks in the file that is being released (a cache file), are marked as "free" and removed from the metadata of the system. The system 10 then awaits additional commands.

Alternatively, if the block manipulation system 207 determines that a command is not deterministic (non-deterministic), the block manipulation system 207 determines if any block from the file was over-written by the file system with reliable data (application data) (block 308) by checking the status of the block. As an example, if the block is still marked as "semifree" then the block was not overwritten with application data. If the block was overwritten with application data, the block manipulation system 207 returns an error message showing that the block no longer exists 309, specifically, that the block was overwritten by application data, and therefore, does not exist for caching. If the block was not overwritten with application data, then the block still contains the information originally saved on it. In such a case, regular block handling is performed 310. The status of the block in the storage device 40 is set to "free" if the block was released and to "semifree" if the block continues to store cached data (block 311). The system 10 then awaits additional commands.

Figure 8:
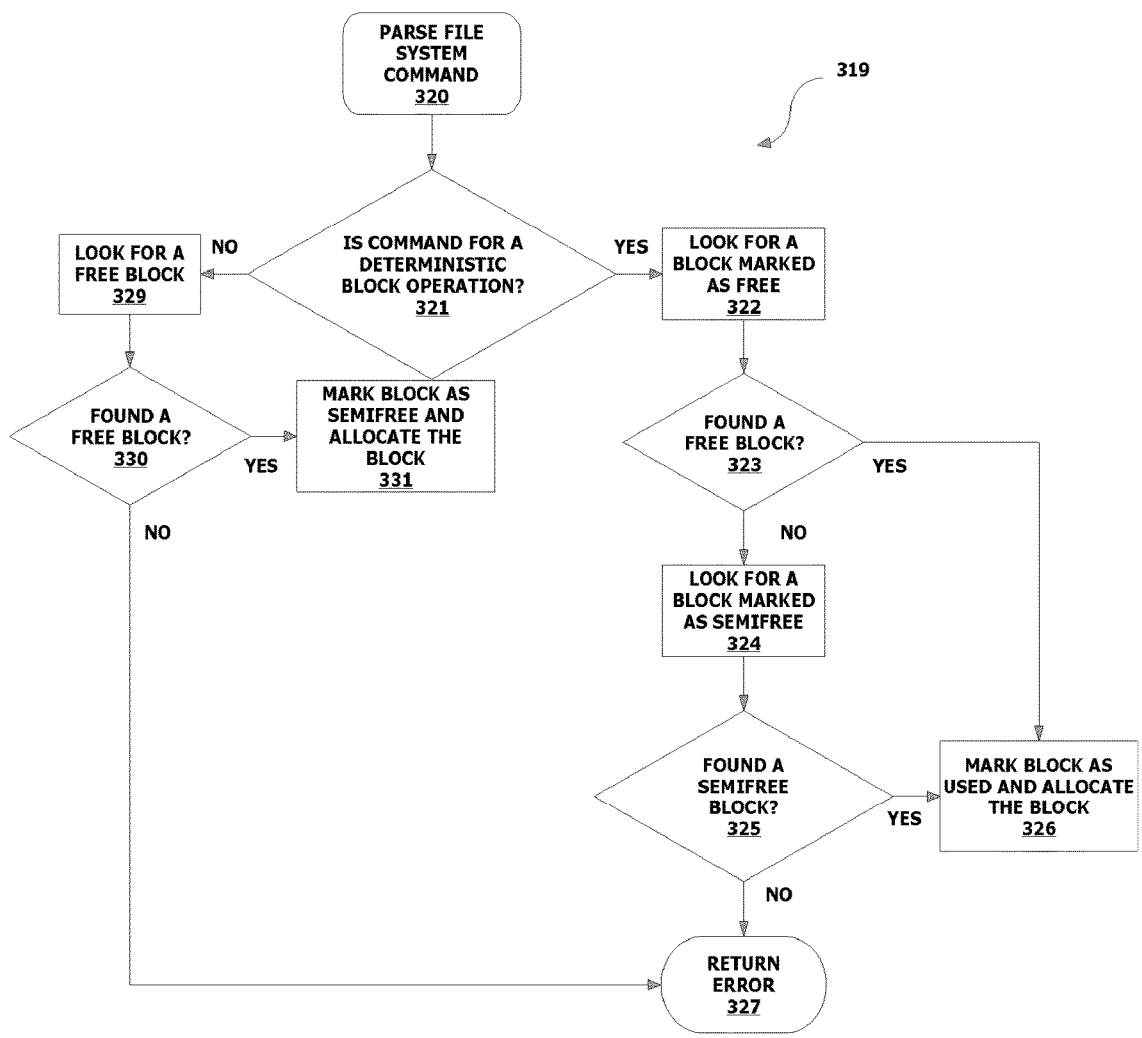
FIG. 8 is a flowchart specifically illustrating how the block manipulation system handles an allocation of a new block within the block storage device.

FIG. 8 is a flowchart 319 specifically illustrating how the block manipulation system 207 handles an allocation of a new block within the block storage device 40. As shown by block 320, the block manipulation system 207 parses the received file system command. The block manipulation system 207 then checks whether the command is for a deterministic block operation or a non-deterministic block operation (block 321).

If the command is for a non-deterministic block allocation, the block manipulation system 207 looks for a "free" block in the storage device 40 (block 329). If during searching for a "free" block (block 330) a "free" block of storage is not found, the function returns an error message since there is no more free space to allocate (block 327). Alternatively, if a "free" block is found, the block is marked as "semifree" (block 331).

If the command is for a deterministic block allocation, the block manipulation system 207 looks for a block marked as "free" (block 322). If during looking for a "free" block (block 323) a "free" block is found, the block manipulation system 207 marks the "free" block as "used" (block 326). It should be noted that FIG. 8 provides an illustration of allocation of a new block. As a result, once a "free" or "semifree" block is found, the block is allocated, but not necessarily written to. Instead, the block gets written to when a write command is issued on this allocated block. If, however, a free block is not found, the block manipulation system 207 looks for a block marked as "semifree" (block 324) that is currently being used for the non-deterministic storage (for cached data). If during looking for a "semifree" block (block 325) a "semifree" block is found currently being used for non-deterministic storage, the block manipulating system 207 marks the block as "used" (block 326) and allocates the block. Alternatively, if no "semifree" block is found, an error message is returned to the user (block 327).

Figure 9:
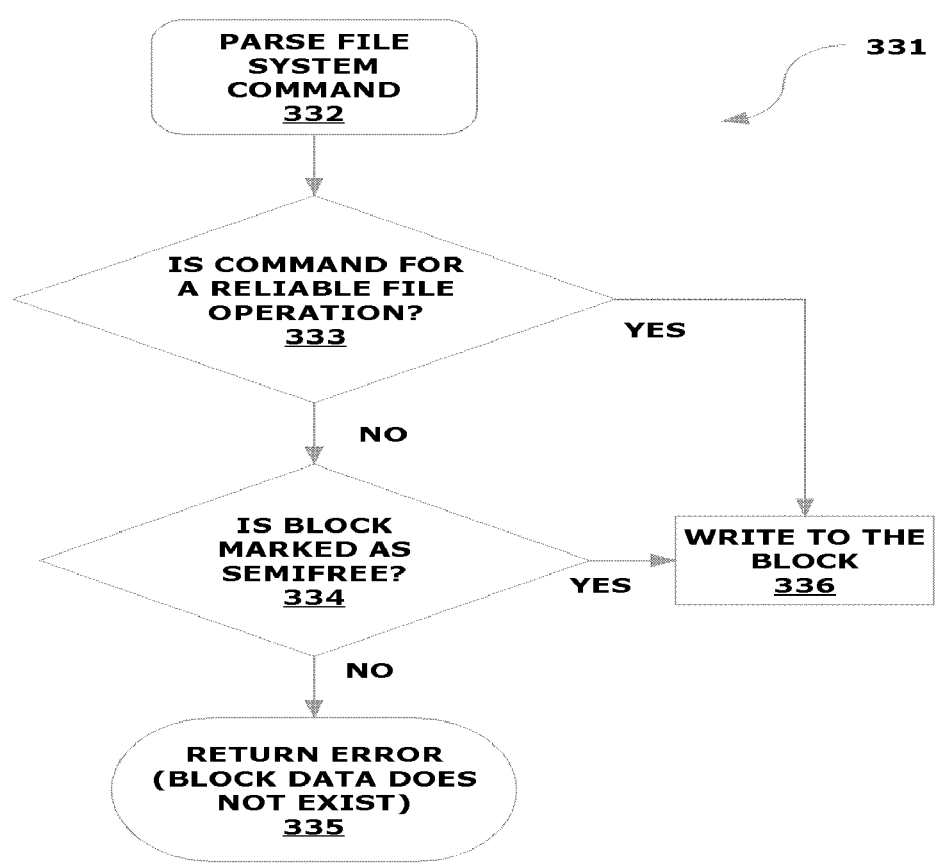
FIG. 9 is a flowchart illustrating how the block manipulating system writes data to an existing block within the block storage.

FIG. 9 is a flowchart 331 illustrating how the block manipulating system 207 writes data to an existing block within the block storage 40 and allocates the block. As shown by block 332, the block manipulation system 207 parses the received file system command. The block manipulation system 207 then checks whether the command is for reliable block operation (block 333).

If the command is for non-deterministic block operation the block manipulation system 207 determines whether the block still belongs to the non-deterministic file system by checking if the block status is still "semifree" (block 334). If the block is still "semifree," the block manipulation system 207 writes to the "semifree" block (block 336). Alternatively, if the block is not "semifree," the block manipulation system 207 returns an error meaning that the block no longer exists (block 335). It should be noted that a block no longer existing means that the block no longer belongs to the non-deterministic file system, namely, that the block was allocated to a deterministic file and is no longer relevant for our needs and cannot be written to.

Figure 10:
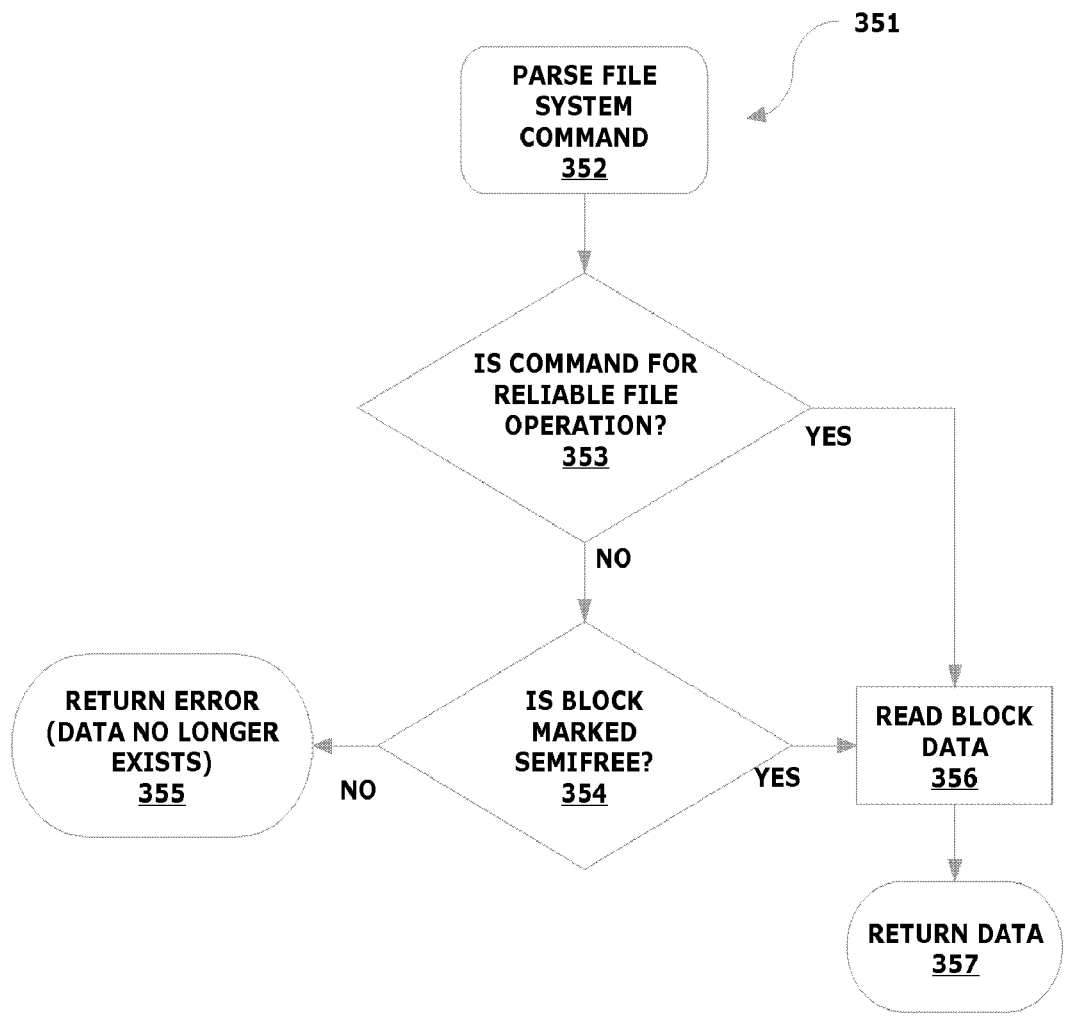
FIG. 10 is a flowchart illustrating how the block manipulating system reads data from an existing block within the block storage.

FIG. 10 is a flowchart 351 illustrating how the block manipulating system 207 reads data from an existing block within the block storage 40. As shown by block 352, the block manipulation system 207 parses the received file system command. The block manipulation system 207 then checks whether the command is for reliable block operation (block 353)

If the command is not for reliable block operation, namely, for non-deterministic block operation, the block manipulation system 207 determines whether the block still belongs to the non-deterministic file system by checking if the block status is still "semifree" (block 354). If the block is still "semifree," the block manipulation system 207 reads the "semifree" block (block 356) and returns the read data from the read block to the user of the system 10 (block 357). Alternatively, if the block is not "semifree," the block manipulation system 207 returns an error meaning that the block no longer exists (block 355).

Figure 11:
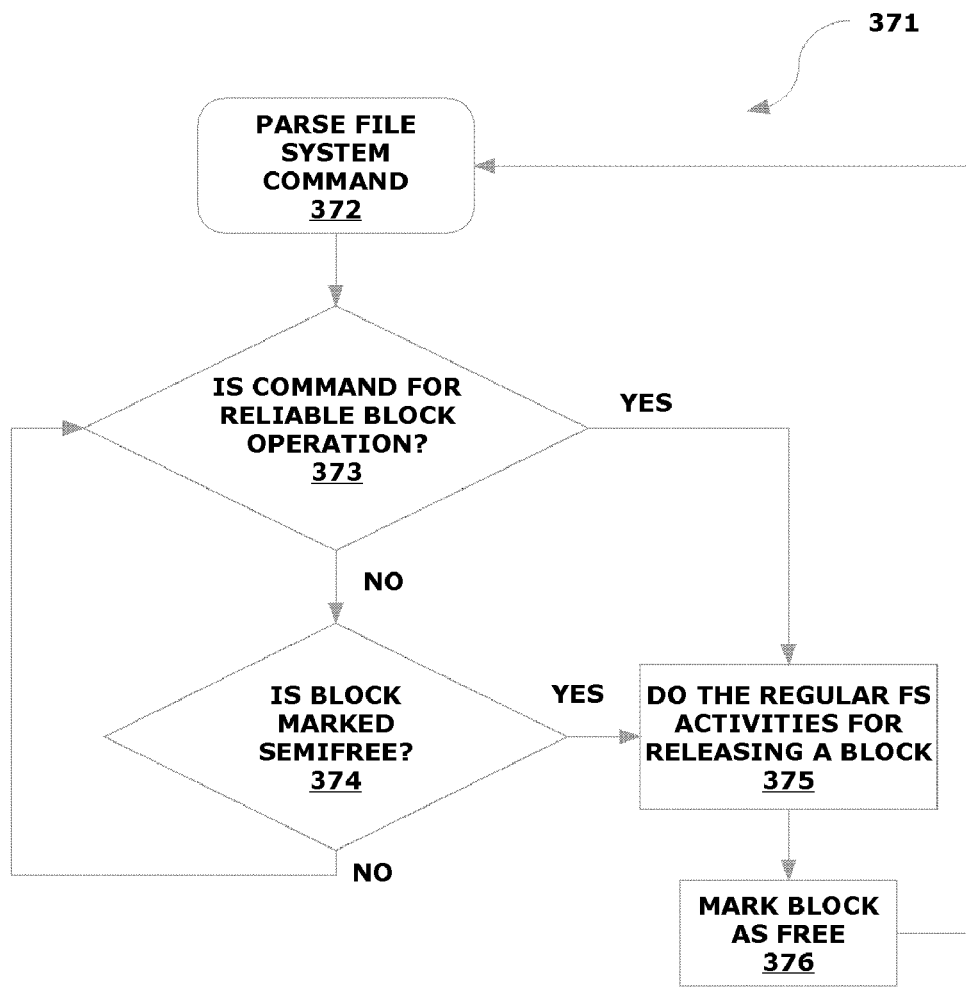
FIG. 11 is a flowchart illustrating how the block manipulating system releases a block of data from the block storage device.

FIG. 11 is a flowchart 371 illustrating how the block manipulating system 207 releases a block of data from the block storage device 40. As shown by block 372, the block manipulation system 207 parses the received file system command. The block manipulation system 207 then checks whether the command is for reliable operation (block 373).

If the command is not for reliable block operation, namely, for non-deterministic block operation, the block manipulation system 207 determines whether the block still belongs to the non-deterministic file system by checking if the block status is still "semifree" (block 374) and returns an error (block 378). If the block is still "semifree." the block manipulation system 207 performs normal file system activities for releasing a block (block 375). The block is then marked as free for future use (block 376).

If the command is for deterministic file operation, the block manipulation system 207 performs regular file system activities for releasing a block (block 375). The block is then marked as free for future use (block 376) and success is returned (block 377).

In accordance with the first exemplary embodiment of the invention, as described above, the file system is required to be replaced, including the block storage handler of the prior art. It should be noted, however, that in accordance with a second exemplary embodiment of the invention, the present cache system and method is implemented by a separate method that does not involve the replacing of the file system. The second exemplary embodiment of the invention is described in detail below.

In this system of the second exemplary embodiment, regular file system calls, namely, calls for reliable data storage, are called directly to the existing file system API of the prior art. The applications that require cache storage may call a non-deterministic file system API (408), which acts in parallel to the existing file system API. There also exists a "listener module" (409), which listens on the standard communication of the file system driver, while the alternative implementation module (410) uses the block device driver to read and write directly to the storage device 40, based on the information that the listener module collects. As is known by those having ordinary skill in the art, a module is a separate piece of software that is referred to as an entity for simplicity.

Figure 12:
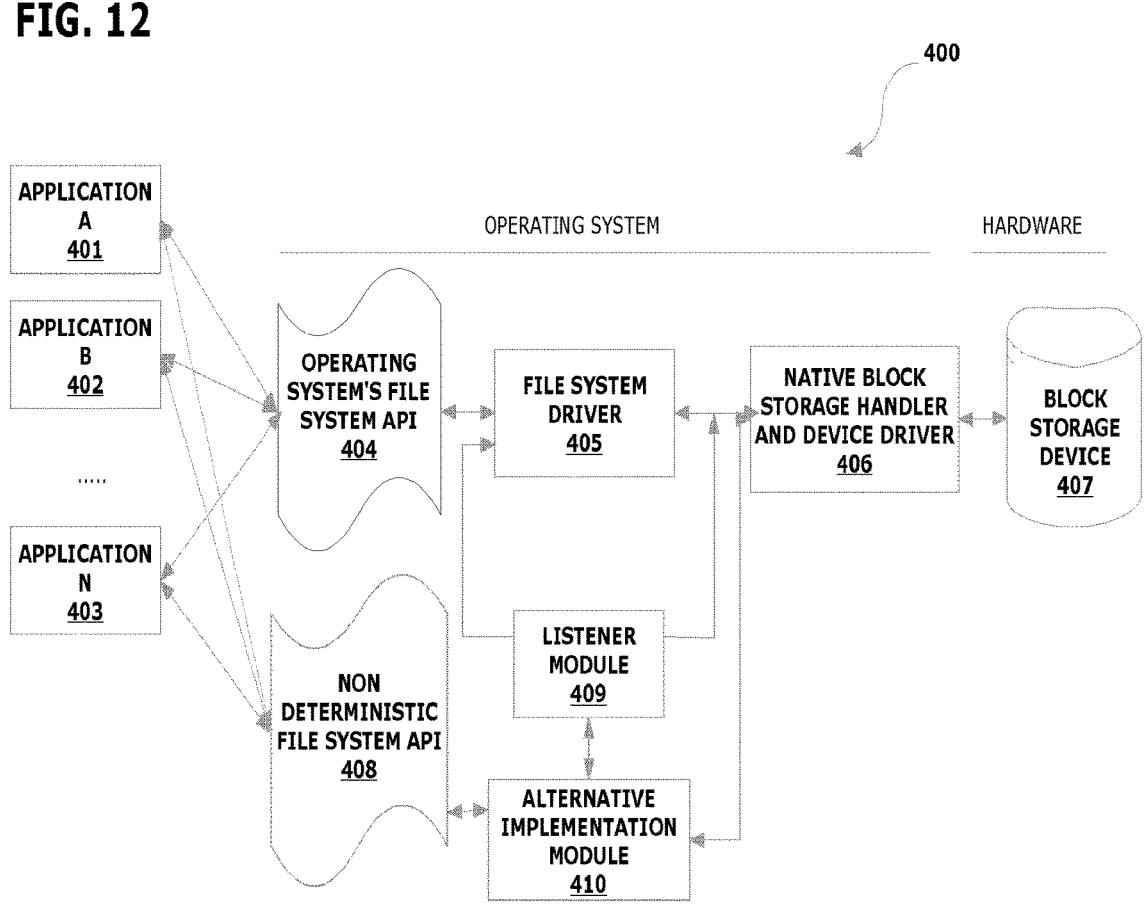
FIG. 12 is a block diagram illustrating a file system, in accordance with a second exemplary embodiment of the invention.

FIG. 12 is a block diagram illustrating a file system 400 in accordance with the second exemplary embodiment of the invention. For exemplary purposes, FIG. 12 shows that there are multiple applications, illustrated as application blocks 401, 402, and 403, that wish to manipulate files (store, write, read, delete, or other function calls). The applications 401, 402, 403, call on a common, operating system level file system API 404 that is capable of implementing the manipulation commands. In addition to this API 404, the file system 400 contains the non-deterministic file system API 408 for handling non-deterministic function calls. The applications 401, 402, 403 call non-deterministic function calls for storing data that may be overwritten by other data stored on a storage device 407, for example, cache data.

A file system driver 405, similar to the file system driver 105 (FIG. 1) of the prior art, is called by the operating system file system API 404. A listener module 409 creates a map of the storage blocks in use by listening on the input of a block storage handler and device driver 406 405 and by querying the file system driver 405 for information regarding data blocks. It should be noted that the listener module's role is to understand which blocks have been written to by the operating system, and which are free, so that the alternative file system can operate in a correct fashion.

The listener module 409 keeps track of the data blocks that the file system is using. For each read and write command received, the listener module 409 updates a table located within this is a table of metadata which is stored in the storage device referred to herein as the ND BLOCK STORAGE DB, with a checksum of the block that is being written or written to, and updates the table as "verified." A verified block is a block for which the non-deterministic system is sure about the contents of the block. It should be noted that initially all blocks are marked as "unverified."

Figures 13A, 13B, 14:
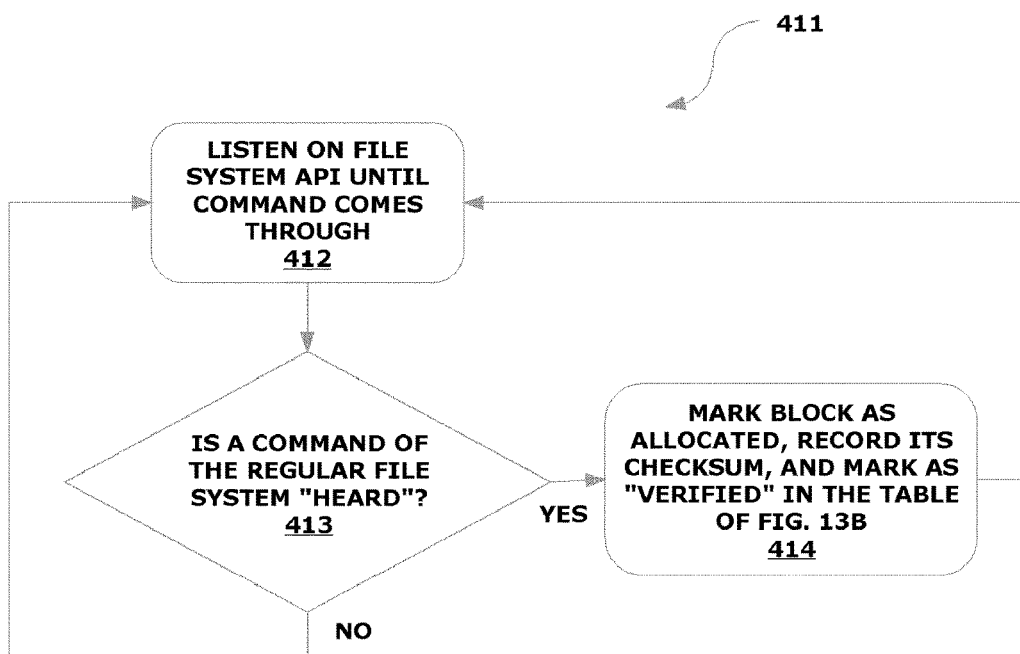
FIG. 13A is an example of a table located within a storage device prior to updating.
FIG. 13B is an example of a table located within a storage device after updating.
FIG. 14 is a flowchart illustrating implementation of a listener module.

FIG. 13A provides a table of files, and FIG. 13B provides a table of blocks, wherein each file is comprised of one or more blocks. FIG. 13A shows an example file called "page1 cache," which is comprised of 5 blocks (122, 123, 124, 926, 927). These blocks are listed in the table of FIG. 13B, where for each such block a checksum is stored and a verified "flag" exists. If the verified flag is "YES," it means that this alternative file system knows that the checksum listed for the block is correct. The alternative file system knows this by either having read the block directly from the disk using the block storage device, or by having listened to the regular file accessing this block and computing its checksum. If the checksum is not verified, then prior to using this block in a file manipulation, the system needs to read it from memory to verify its checksum. The checksum also exists in the table of FIG. 13A for the following reason: FIG. 13B contains a list of all the blocks that this alternative system has listened to, whether they are part of a non-deterministic file or not. The table of FIG. 13A lists the blocks of the non-deterministic blocks, and their expected checksum. When accessing a file, the system compares the checksum of each block in FIG. 13A to the checksum of that block in FIG. 13B, assuming that it is verified, since if it is not—it first reads it from the hard drive. Specifically, FIG. 13A and FIG. 13B illustrate how the alternative embodiment stores information regarding non-deterministic files and maps the file system. FIG. 13A illustrates a mapping between file names to block numbers and storing the checksum of each block for validity checks. FIG. 13B illustrates a mapping between block numbers that are in use by the table of FIG. 13A to their checksum. The blocks of FIG. 13B are initially marked as un-verified and as the checksum of the block numbers is verified, the blocks are marked as verified. A verified block is a block whose checksum is known to the system and marked in the table.

FIG. 14 is a flowchart 411 illustrating the implementation of the listener module 409. As shown by block 412, the listener module 409 listens on the operating system file system API 404 and continues to determine if a command of a regular file system is received by the listening module 409 (block 413). There are various methods that may be used for the listener module 409 to listen on the operating system, one of them being to insert software between various operating system components as a transparent proxy (i.e., piece of software that does nothing but relay messages back and forth without modifying them), which listens to the traffic going through the operating system. Upon seeing a block command on a block that is of relevance to the system, namely that appears as a block owned by a file in the table of FIG. 13A, the listing module 409 marks the block as verified and stores its checksum in the table of FIG. 13B (block 414).

Figure 15:
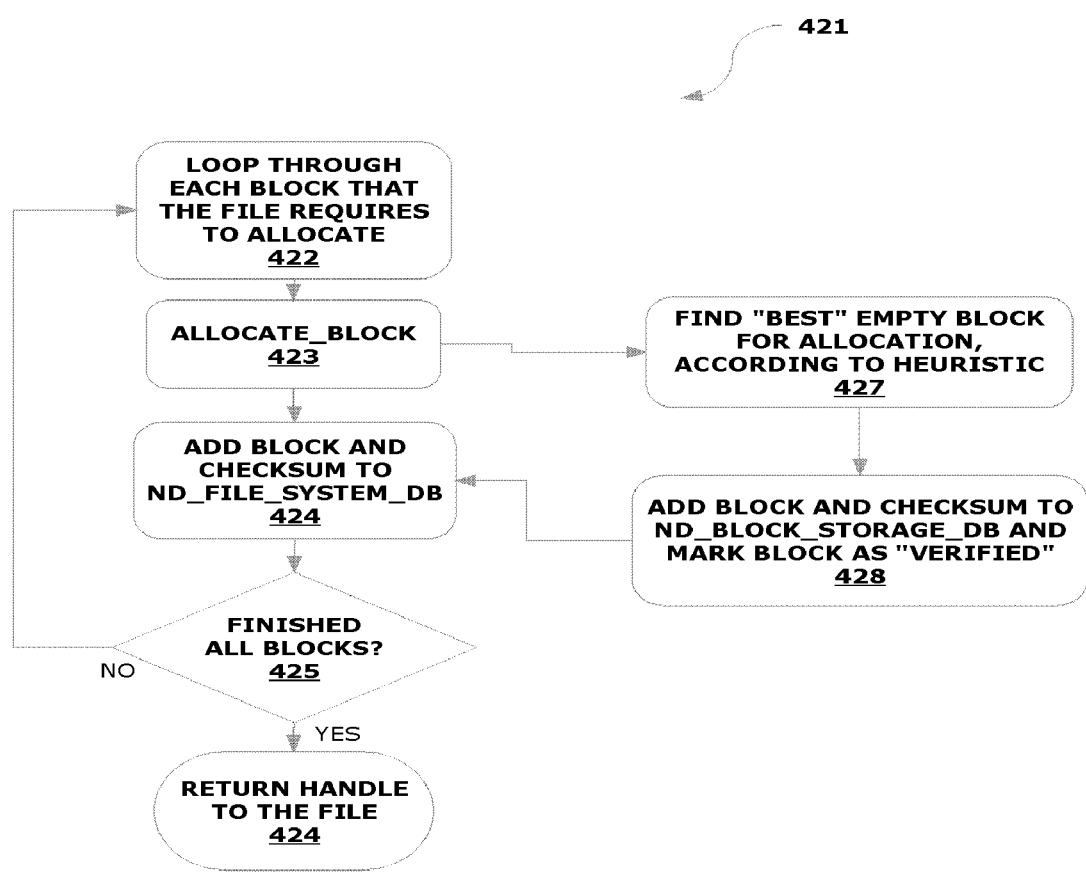
FIG. 15 is a flowchart illustrating actions performed by the system of FIG. 12 when a new non-deterministic file is created.

FIG. 15 is a flowchart 421 illustrating actions performed by the system of FIG. 12 when a new non-deterministic file is created. The number of blocks required for the new file is calculated and each block that the file requires to allocate is looped through (block 422). It should be noted that looped through means that for each such block, the rest of the actions are performed. As an example, if there are 10 blocks to allocate, then 423, 424 and 425 are performed for each of the 10 blocks. The blocks that are required for the new file are then allocated (block 423). The allocated blocks are then added to the table of FIG. 13A (ND FILE SYSTEM DB) (block 424) in order to keep track of the blocks related to that specific file. A determination is then made as to whether all blocks that were required for the new file have been allocated (block 425).

During allocation of the blocks (block 423), the block storage device 407 is asked to allocate a "best" space for an empty block for the system (block 427). It should be noted that in systems where the block storage device can be asked to allocate a block in a specific storage location, the heuristic determines where the best place for the block would be by learning the previous allocation patterns of the operating system. In systems where the block device cannot be asked to allocate in a specific storage location, the heuristic is not active. In accordance with the alternative embodiment of the invention, the "best" space is found by applying the heuristic whose primary goal is to find a space for this block that is assumed to be less likely to be overwritten soon by the known file system, as an example, finding a space that is distanced from other spaces that have recently been written to. As shown by block 428, when each block is written, the block it is added to the table of FIG. 13B (ND BLOCK STORAGE DB) and marked as "verified."

Figure 16A:
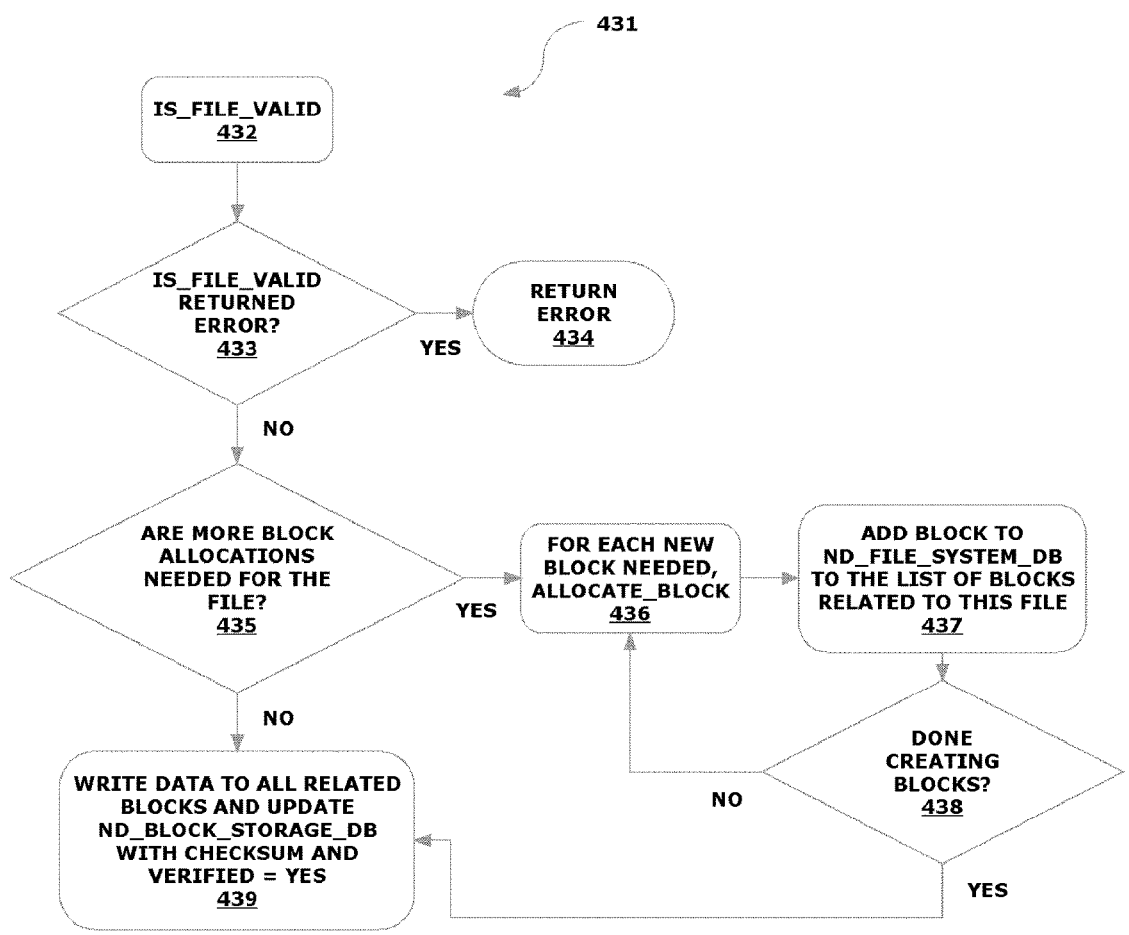
FIG. 16A is a flowchart illustrating actions performed by the system of FIG. 12 when writing to an existing file.

FIG. 16A is a flowchart 431 illustrating actions performed by the system of FIG. 12 when writing to an existing non-deterministic file. As shown by block 432, it is first determined whether the file being written to is still valid. It should be noted "valid" refers to all of the "semifree" blocks that belong to the file not being overwritten/used by the regular file system.

FIG. 16B is a flowchart 441 further illustrating the step of determining whether the file being written to is still valid. As shown by block 442, all data blocks of the existing file, as listed in the table of FIG. 13A (ND FILE SYSTEM DB) are looped through. For each block, the system checks that the checksum for the block matches the checksum in the table of FIG. 13A (ND FILE SYSTEM DB) and that the block is verified (block 443). During determining whether a block is verified (block 444), if it is determined that the block is not verified, the block is verified by reading the checksum of the block through the file system driver 405 (block 448). The checksum in the table of FIG. 13B (ND BLOCK STORAGE DB) can then be updated (block 449).

As shown by block 445, a determination is then made as to whether the checksum in the table of FIG. 13A (ND FILE SYSTEM DB), which is the checksum that is expected to be stored in the block, matches the checksum of the block in the table of FIG. 13B (ND BLOCK STORAGE DB). If there is a match, it means that the block physically stored contains the data that was expected for the file. A determination is then made to determine if all blocks of the file have been verified (block 446). If all blocks have not been verified the process continues until all blocks have been verified, after which the user is provided with confirmation of success (block 447). Alternatively, as shown by block 450, if the checksum is not the same, the block is removed from the storage device 407 and an error is returned to the user (block 451).

Returning to FIG. 16A, a determination is made as to whether when checking if the file was valid, an error was returned (block 433). As is shown by block 434, if the file is not valid, an error is returned. If instead, the file is valid, a determination is then made to determine if the size of the file needs to be increased for the "write" action (block 435). As shown by block 436, if the file size does need to be increased, the increase is performed by allocating new blocks. Then the blocks are added to the list of blocks associated with the specific file (block 437). After creating each new block a determination is made as to whether more new blocks are required (block 438). If the system has not completed the creation of new block, new blocks are added. Alternatively, data is written to all related blocks and the table of FIG. 13B (ND_BLOCK_STORAGE_DB) is updated with the checksum of the related blocks, after which verification of the blocks is set to "yes" (block 439).

Figure 17A:
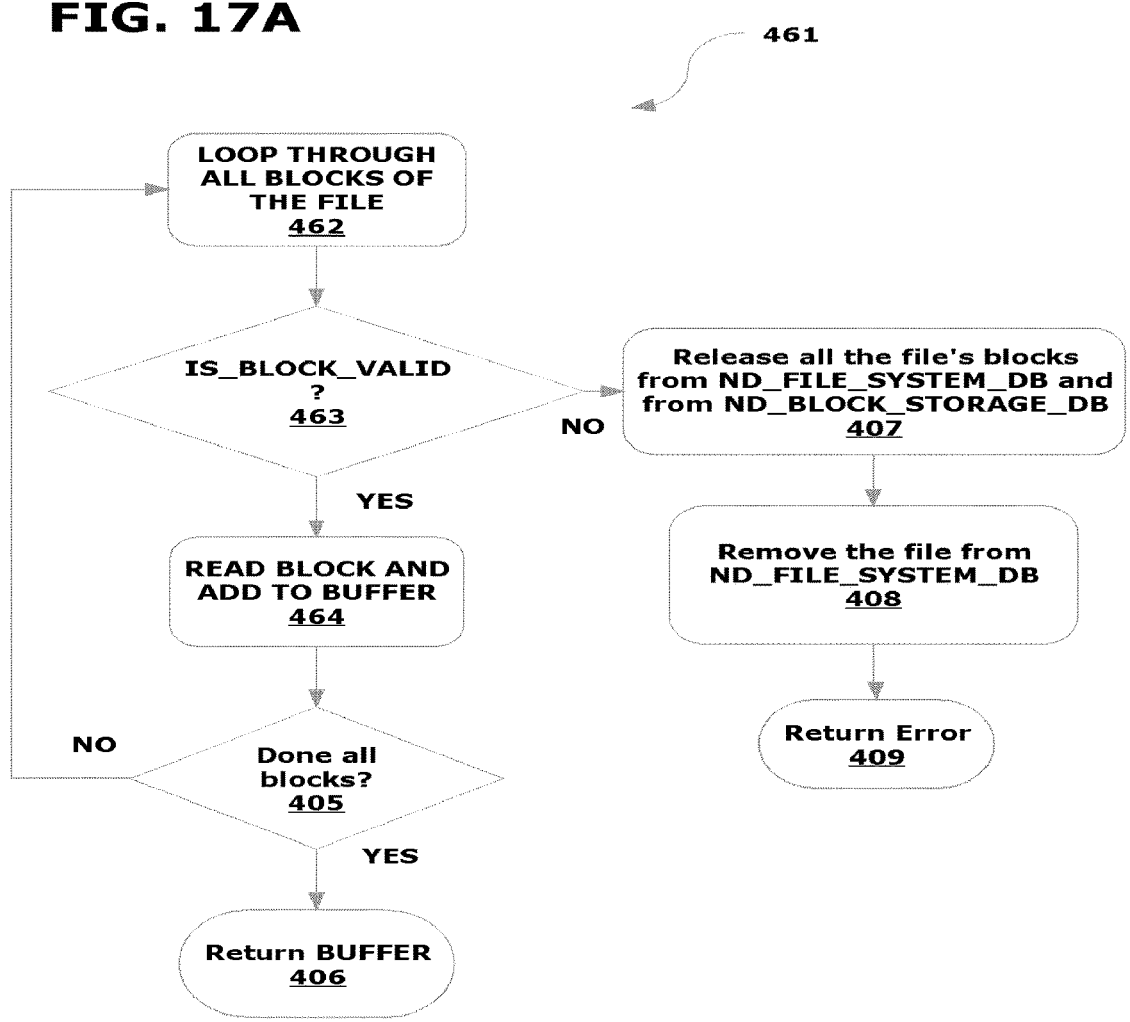
FIG. 17A is a flowchart illustrating actions taken by the system when a non-deterministic "file read" command is received.
Figure 17B:
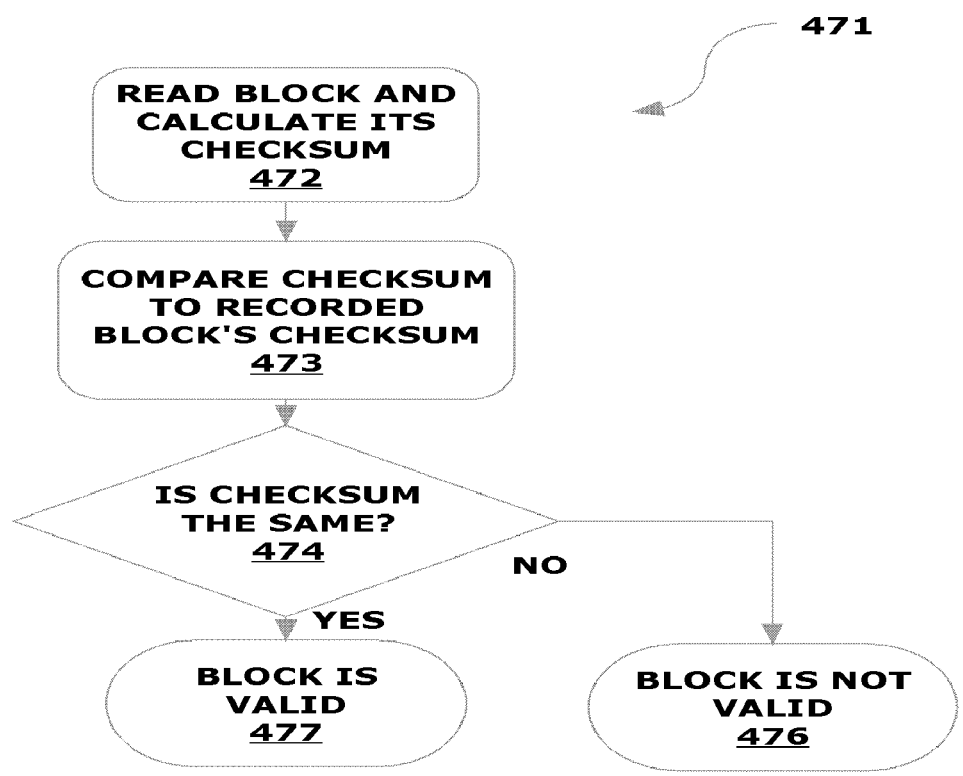
FIG. 17B is a flowchart further illustrating the step of determining if a block is still valid.

FIG. 17A is a flowchart 461 illustrating actions taken by the system when a non-deterministic "file read" command is received. As shown by block 462, all data blocks of the file being read are looped through and each data block is checked to see if it is still valid (block 463), meaning whether the block still contains the data in which the user is interested. FIG. 17B is a flowchart further illustrating the step of determining if a block is still valid.

Returning to FIG. 17A, if the block does not contain data in which the user is interested in, all of the blocks of that file are released from the tables of the database 407 (block 467), the file is deleted from the table of FIG. 13A (ND_FILE_SYSTEM_DB) (block 468), and an error message is returned to the user (block 469).

Alternatively, if the block does contain data in which the user is interested, the block is read and added to a buffer (block 464). It should be noted that the non-deterministic file may contain a number of blocks. When reading the file, all blocks have to be read, and their aggregate content is the file that the application wants to get from the system. For this purpose, a buffer is allocated at the onset of this action in FIG. 17A, and its contents are then returned to the user. A determination is then made to see if all blocks of the file being read have been considered (block 465) and if so, a completion notification is returned to the user (block 466).

As previously mentioned, the process of determining if a block is valid is illustrated by the flowchart 471 of FIG. 17B. As shown by block 472, the block of the file is read and the checksum of the block is calculated. The calculated checksum of the block is compared to the recorded checksum of the block (block 473). When comparing the checksums (block 474), if the checksums are the same, the system knows that the block is valid (block 477). Alternatively, if the checksums are not the same, the block is known not to be valid (block 476).

Figure 18:
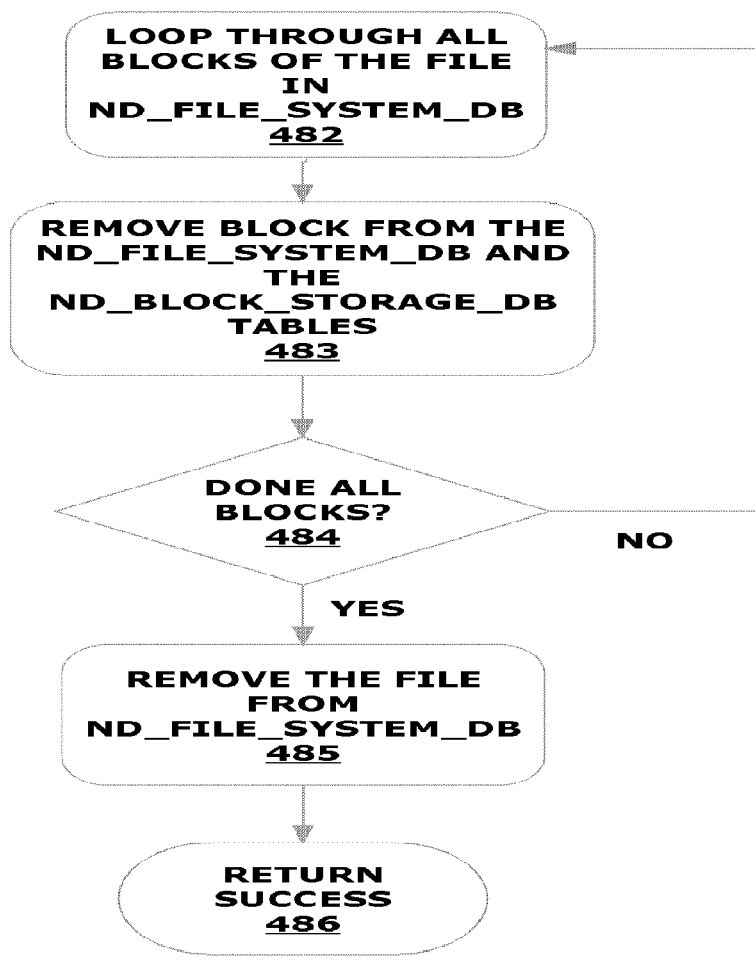
FIG. 18 is a flowchart illustrating the process of releasing a file (deleting a file) from the non-deterministic file system.

FIG. 18 is a flowchart 481 illustrating the process of releasing a file (deleting a file) from the non-deterministic file system. As shown by block 482 the blocks of the file in the table of FIG. 14A that are being released are looped through. Each block of the file is removed from the table of FIG. 13A and the table of FIG. 13B so that the blocks have been removed from the storage device (block 483). A determination is then made to see if all blocks have been removed (block 484). If all blocks have not been removed, blocks of the file in the table of FIG. 13A continue to be released (block 482). Alternatively, if all blocks have been removed, the file is removed from the table of FIG. 13 (block 485), after which the user is notified of successful completion of the process of file releasing (block 486).

It should be noted that the present invention is intended to cover other ways of implementing storage of cache on free portions of the disk (storage device). As an example, the names "free", "used", and "semifree" need not be used, but instead, other designations for blocks may be used, such as, for example, but not limited to, a first, second, and third category of storage blocks. As such, the first category of storage blocks includes storage blocks that are available to the system for storing data when needed, the second category of storage blocks includes storage blocks containing application data therein, and storage blocks within the third category of storage blocks includes storage blocks that are storing cached data and that are available for storing application data if no first category of storage blocks are available to the system. One having ordinary skill in the art will appreciate that non-used blocks, as categorized by the present system and method, are viewed by the user and application as free space.

In addition to the abovementioned, it is noted that in accordance with the present invention, it is possible for a block to be in use by the non-deterministic system (i.e., marked "semifree"), then used and released by the deterministic system (i.e., marked as used then free), and then allocated again by the non-deterministic system (i.e., marked as "semifree" now). As a result, when the non-deterministic system wants to read the data from this block, the system would see that the block is "still" marked as "semifree", and the system would assume that the information on the block is correct. In accordance with an alternative embodiment of the invention, this situation can be fixed by either storing the checksum of the block as metadata, or by marking blocks as obsolete in the non-deterministic system once the blocks been overwritten by the deterministic file system.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. A method for using a resource by one or more applications, the resource comprising multiple resource components that are individually accessed and controlled by an operating system for being used by the one or more applications, each of the resource components is tagged using a first tag, a second tag, or a third tag, and each of the resource components is capable of being used by the one or more applications for a first purpose and a second purpose, the method comprising the steps of:
   receiving, from an application by an operating system, a request to use a resource component for the first purpose; and
   determining, by the operating system, if a first resource component associated with the first tag is available in the resource;
   if a first resource component associated with the first tag is available, then:
   selecting the first resource component associated with the first tag;
   using the selected first resource component by the application for the first purpose; and
   tagging the first resource component with the third tag;
   receiving, from an application by an operating system, a request to use a resource component for the second purpose; and
   determining, by the operating system, if a third resource component associated with the first tag is available in the resource;
   if a third resource component associated with the first tag is available, then:
   selecting the third resource component associated with the first tag;
   using the third resource component by the application for the second purpose; and
   tagging the third resource component with the second tag.

2. The method according to claim 1, further comprising the step of changing a resource component tag from the second or third tag to the first tag.

3. The method according to claim 1, further comprising the steps of in response to the determining, by the operating system, if the first resource component associated with the first tag is available in the resource;
   if a first resource component associated with the first tag is not available in the resource, then:
   selecting a second resource component associated with the second tag; and
   using the selected second resource component by the application for the first purpose;
   and tagging the second resource component with the third tag.

4. The method according to claim 1, further comprising the steps of:
   determining if a resource component associated with the first tag or with the second tag is available for use; and
   notifying the application if no resource component in the resource is associated with the first tag or with the second tag.

5. The method according to claim 4, wherein the notifying includes returning an error code.

6. The method according to claim 1, wherein the resource is a data storage device, the resource components are data storage blocks in the data storage device, and the first purpose is storing data in the data storage blocks.

7. The method according to claim 6, wherein the second purpose is storing cache data in the data storage blocks.

8. The method according to claim 6, wherein the first tag is associated with a data block available for storing data by the application.

9. The method according to claim 6, wherein the second and third tags are associated with a data block not available for storing data by the application.

10. The method according to claim 1, wherein each resource component is associated with an entry that comprises a component identifier.

11. The method according to claim 10, wherein the resource is a data storage device and the resource components are data storage blocks in the data storage device, and wherein each entry comprises a block index, a block checksum, and a verification field that indicates if the block corresponding to the entry is verified.

12. The method according to claim 11, further comprising the step of obtaining the entry associated with at least one of the resource components entries.

13. The method according to claim 11, further comprising the step of calculating a checksum for at least one of the resource components.

14. The method according to claim 13, further comprising the step of storing the calculated checksum for at least one of the resource components.

15. The method according to claim 13, further comprising the step of comparing a stored calculated checksum to the calculated checksum.

16. The method according to claim 15 wherein if the stored calculated checksum of a resource component matches the calculated checksum of the resource component, tagging the respective resource component as verified.

17. The method according to claim 15, wherein if the stored calculated checksum of a resource component does not match the calculated checksum of the resource component, tagging the respective resource component as non-verified.

18. The method according to claim 1, wherein at least part of the steps interfaces an operating system using an operating system Application Programming Interface (API).

19. The method according to claim 1, wherein at least part of the steps are based on, or use, intercepting a communication with an operating system.

20. The method according to claim 19, wherein at least part of the steps include using transparent proxy to the operating system.

21. The method according to claim 19, wherein at least part of the steps include communicating with a file system of the operating system.

22. A non-transitory computer readable medium containing computer instructions that, when executed or interpreted by a processor, cause the processor to perform the steps of claim 1.

* * * * *